United States Patent [19]

Hattori et al.

[11] Patent Number: 4,741,429
[45] Date of Patent: May 3, 1988

[54] CENTERING APPARATUS FOR CERAMIC ARTICLES AND THE LIKE

[75] Inventors: Isao Hattori; Hiroyuki Tsuji, both of Nagoya, Japan

[73] Assignee: NGK Insulators, Ltd., Japan

[21] Appl. No.: 844,106

[22] Filed: Mar. 26, 1986

[30] Foreign Application Priority Data

Mar. 29, 1985 [JP] Japan ................... 60-63388

[51] Int. Cl.⁴ ............ B65G 47/24; B65G 47/26
[52] U.S. Cl. .................... 198/456; 198/345; 198/416; 198/434
[58] Field of Search ............... 198/456, 468.9, 468.2, 198/345, 597, 416, 434

[56] References Cited

U.S. PATENT DOCUMENTS

| | | | |
|---|---|---|---|
| 3,089,576 | 5/1963 | Sauer et al. | 198/456 X |
| 3,250,373 | 5/1966 | Yanoshita | 198/379 |
| 3,470,997 | 10/1969 | Trounce | 198/456 X |
| 4,302,919 | 3/1981 | Hartness | 198/345 X |
| 4,605,115 | 8/1986 | Genas | 198/345 X |

FOREIGN PATENT DOCUMENTS

| | | | |
|---|---|---|---|
| 220947 | 4/1985 | German Democratic Rep. | |
| 423715 | 9/1974 | U.S.S.R. | 198/456 |

*Primary Examiner*—Randolph A. Reese
*Assistant Examiner*—John A. Ricci
*Attorney, Agent, or Firm*—Parkhurst & Oliff

[57] ABSTRACT

A centering apparatus for ceramic articles or the like is disclosed, which articles are conveyed by a conveyor belt from one station to another. To facilitate further handlings of the articles, e.g. a clamping operation by a clamping device, the apparatus is arranged to align the articles into a proper orientation. The apparatus includes a first pair of centering members to center the article substantially transversely of the conveyor belt, and a second pair of centering members to center the article substantially longitudinally of the conveyor belt.

4 Claims, 3 Drawing Sheets

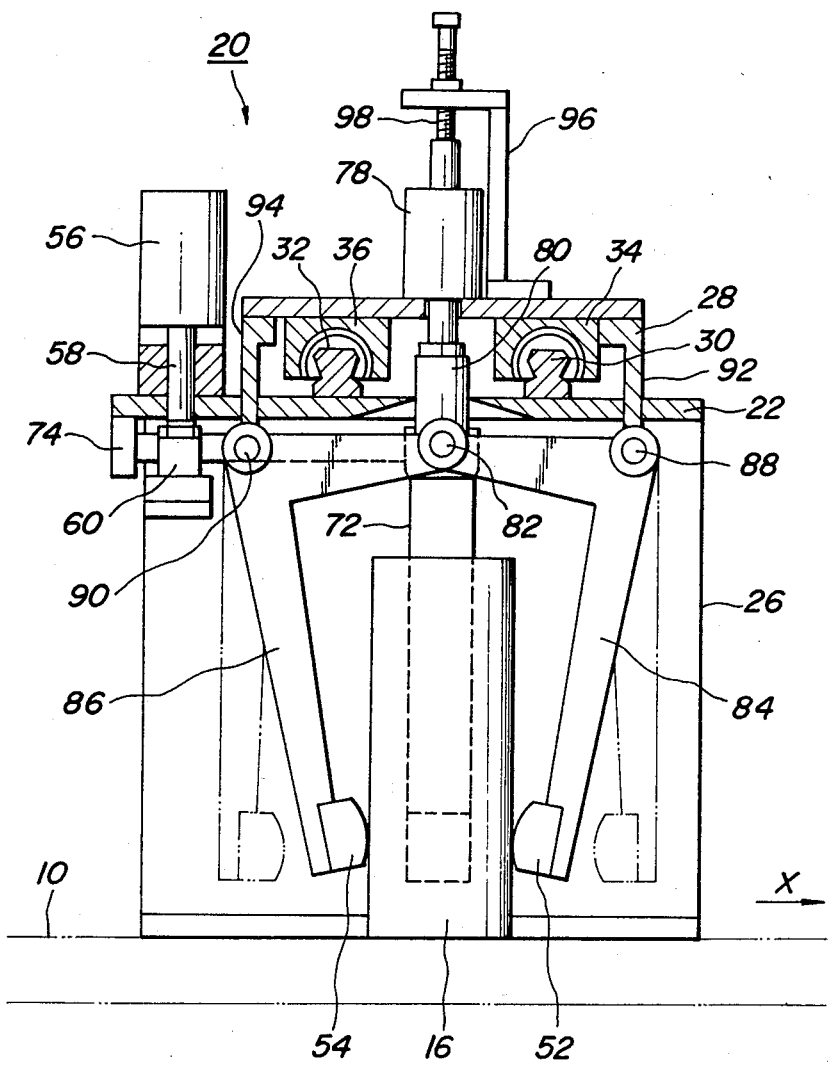

FIG_3
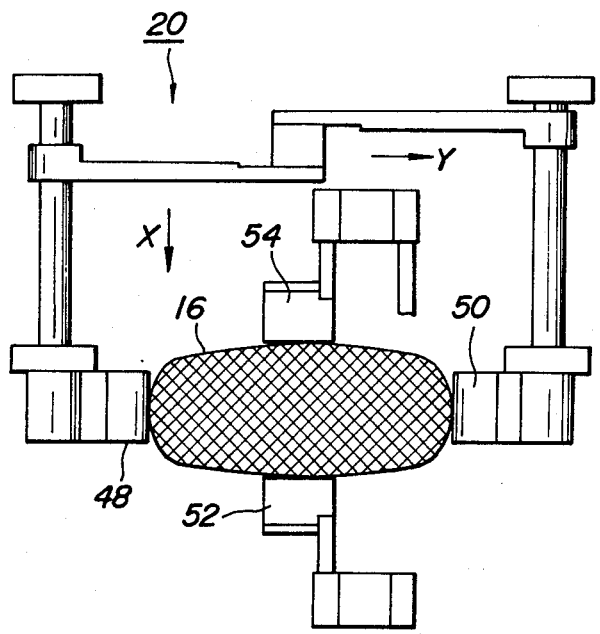
FIG_4
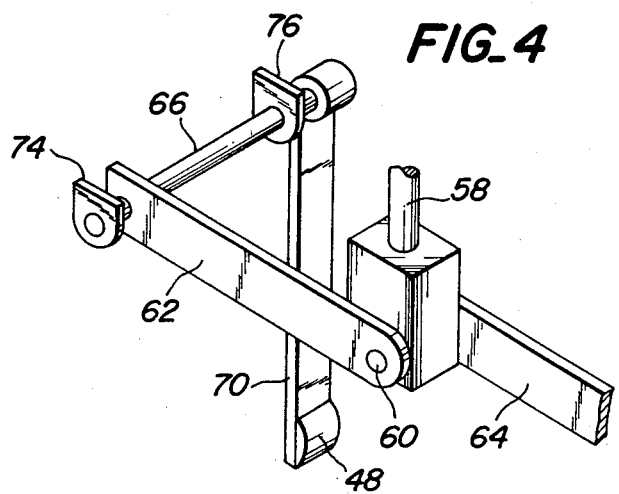

CENTERING APPARATUS FOR CERAMIC ARTICLES AND THE LIKE

BACKGROUND OF THE INVENTION

1. Field of the Invention

The present invention relates to a centering apparatus for articles supported on, and conveyed by a conveyor belt, such as ceramic articles and the like, whereby the articles are centered to a predetermined position on the conveyor belt to have a desired orientation to facilitate subsequent handlings of the articles.

2. Description of the Related Art

In order to transfer articles from one station to another, it is known to make use of a clamping device including a pair of clamp jaws secured to the free ends of movable arms, respectively, by which articles supported on a feed conveyor belt are clamped and transferred onto a delivery conveyor belt. When, however, the articles to be transferred are conveyed by the feed conveyor belt, with their orientation left unadjusted, the fixed motion of the clamping device results in a tendency in that the article is not accurately positioned with a proper orientation between the clamp jaws, or that the article comes into collision with the clamp jaws. Particularly, when the article to be transferred is a ceramic article with an extremely fine internal structure, such as a thin-walled, ceramic honeycomb structural body, it becomes difficult to avoid damage or breakage of the article arising from the collision with the clamp jaws or inadequately applied clamping force.

It has thus been recognized necessary to effect centering of the articles to be transferred, in advance of the clamping operation, by positioning each article into a proper orientation longitudinally and transversely of the conveyor belt, and this requires a troublesome and time consuming manual operation.

These problems may be eliminated by making use of a clamping device with an advanced or elaborate control function whereby the article to be transferred can be properly clamped by actuating the clamp jaws in accordance with the orientation of each article. However, such a device is costly and disadvantageous in that a longer time is required to complete the clamping operation.

SUMMARY OF THE INVENTION

It is, therefore, an object of the present invention to provide an automated apparatus which makes it possible to effect an accurate centering of the article to be transferred, in a short time, and in a simple and reliable manner.

According to the present invention, the centering apparatus includes a first, stationary frame arranged across said conveyor belt; a first pair of centering members both carried by said first frame, having respective first ends adapted to be moved toward and away from each other substantially transversely of the conveyor belt; and first actuator means mounted on the first frame and connected to respective another ends of the centering members of the first pair, for actuating these centering members such that their first ends are moved toward each other while maintaining a predetermined first distance therebetween.

The apparatus further includes a second, movable frame adapted to be moved into, and out of an operative position along said conveyor belt; a second pair of centering members both carried by said second frame, having respective first ends adapted to be moved toward and away from each other substantially longitudinally of the conveyor belt, at least in the operative position of the second frame; and second actuator means mounted on the second frame and connected to respective second ends of the centering members of the second pair, for actuating their centering members such that their first ends are moved toward each other while maintaining a predetermined second distance therebetween.

These elements are arranged such that the above-mentioned first ends of the centering members of the first pair are engageable with respective side surfaces of each article, while the above-mentioned first ends of the centering members of the second pair are engageable with front and rear surfaces of the article, respectively, in the operative position of the second frame, and that the second pair of the centering members allows an undisturbed movement of the article along the conveyor belt when the second frame is out of the operative position.

With the above-mentioned arrangement of the present invention, provision of the first and second pairs of the centering members ensures that the articles to be transferred are automatically and accurately centered to a predetermined location of the conveyor belt in a short time, and in a simple and reliable manner. The articles to be transferred can be aligned on the conveyor belt with a proper orientation, and can thus be transferred to a subsequent station efficiently, by means of a fixed motion of a less costly clamping device without an elaborate control function.

During the centering of each article to be transferred, the two centering members forming each pair are actuated with their opposite centering ends moved toward each other, i.e. toward the article. Thus, in order to avoid damages to the article to be transferred, in accordance with a preferred embodiment of the present invention, the minimum distance between the opposite centering ends of at least one pair is determined so as to be slightly greater than the size of the article as measured in a direction in which the centering ends are moved.

BRIEF DESCRIPTION OF THE DRAWINGS

FIG. 2 is a side view, also partly in section, of the apparatus shown in FIG. 1;

FIG. 3 is a schematic plan view showing the arrangement of two pairs of the centering members in the apparatus of FIG. 1; and FIG. 4 is a perspective view showing the connection of elements forming a centering mechanism.

DESCRIPTION OF THE PREFERRED EMBODIMENTS

Figure 1:
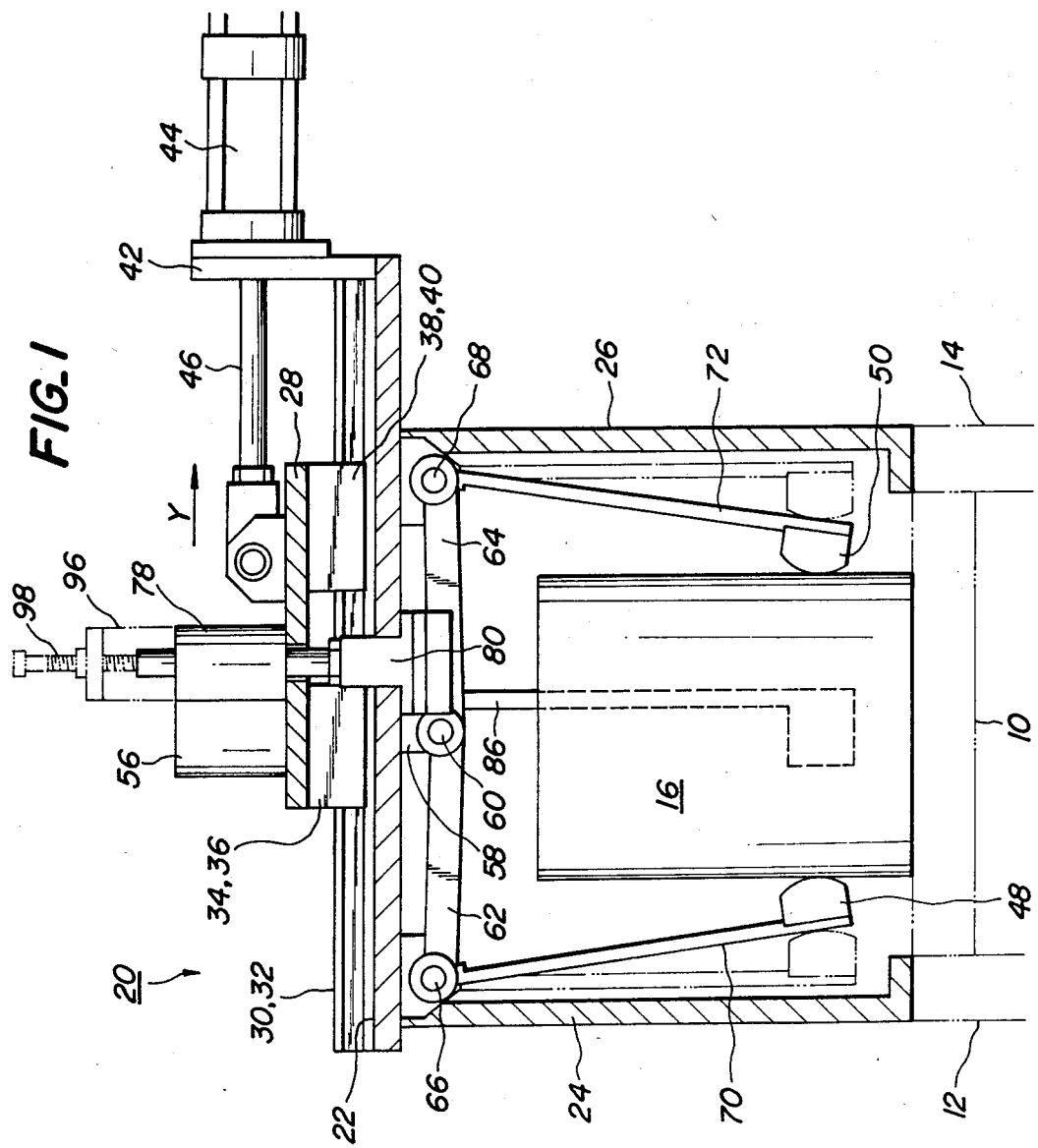
FIG. 1 is a front view, partly in section, of the centering apparatus in accordance with one preferred embodiment of the present invention.

Referring now to the drawings, there is shown in FIGS. 1 through 3 one preferred embodiment of the centering apparatus in accordance with the present invention.

The apparatus is arranged above and across an endless conveyor belt 10 having a pair of side frames 12, 14, which serves to transfer a plurality of articles 16 from one station to another for further handlings. The article 16 is illustrated in the drawings as consisting of a ceramic, honeycomb structural body. Centering of the articles 16 is effected so that they can be properly clamped by a clamping device, not shown, arranged in the discharge end region of the conveyor belt 10.

The apparatus, designated as a whole by reference numeral 20, includes a stationary frame 22 mounted on support members 24, 26 which are rigidly secured to the side frames 12, 14 of the conveyor belt 10, respectively. The stationary frame 22 carries thereon a movable frame in the form of a carriage 28 which is arranged so as to be movable transversely of the conveyor belt 10. To this end, a pair of parallel guide tracks 30, 32 are arranged on the upper surface of the stationary frame 22, while the carriage 28 has two pairs of guide wheels 34, 36, 38, 40 of which each pair corresponds to the two guide tracks 30, 32. Furthermore, a bracket 42 with a vertical web portion is mounted on the upper surface of the stationary frame 22 adjacent to one side edge thereof, to which web portion is secured an air cylinder device 44. The air cylinder device 44 has a plunger 46 with its end connected to the carriage 28 such that the carriage 28 may be moved along the guide tracks 30, 32, i.e. transversely of the conveyor belt 10.

As schematically shown in FIG. 3, the apparatus 20 includes two centering mechanisms; the first for centering the article 16 in the transverse direction Y of the conveyor belt 10, and the second for centering the article 16 in the longitudinal direction X of the conveyor belt 10. The first centering mechanism, effective in the transverse direction Y, has two centering elements 48, 50 which are engageable with the front and rear surfaces of the article 16 respectively. Similarly, the second centering mechanism, effective in the longitudinal direction X, has two centering elements 52, 54 which are engageable with both side surfaces of the article 16, respectively. The arrangement of each centering mechansim will be explained below.

The first centering mechanism includes an air cylinder device 56 forming a first actuator, which is fixedly mounted on the stationary frame 22. As shown in FIG. 2, the air cylinder device 56 is vertically arranged in the rear center region of the frame 22, and has a plunger 58 with its lower end carrying a horizontal connecting pin 60 which extends longitudinally of the conveyor belt 10. There are arranged, as shown in FIG. 1, two horizontal arms 62, 64 extending transversely of the conveyor belt 10, each having an inner end pivotably connected to the pin 60. Outer ends of the arms 62, 64 are fixedly connected to horizontal connecting rods 66, 68 at their rear ends, respectively, which are arranged along respective side edges of the frame 22 and rotatably journaled by bearings secured to the lower surface of the frame 22. The front ends of the rods 66, 68 are fixedly connected to the upper ends of vertical arms 70, 72, respectively, the lower ends of which are provided with the above-mentioned centering elements 48, 50 in the form of pads made of rubber or the like elastic material. The connection of the above-mentioned elements is more clearly illustrated in FIG. 4, in which the bearings for the connecting rods 66, 68 are denoted by reference numerals 74, 76.

With the above mentioned arrangement of the first centering mechanism, when the air cylinder device 56 is actuated to move the plunger 58 upwards, the horizontal arms 62, 64, are caused to swing upwardly about the respective axes of the connecting rods 66, 68. As the result, the vertical arms 70, 72 are caused to swing inwardly also about the axes of the connecting rods 66, 68, so that the pads 48, 50 are moved toward each other in the direction Y, i.e. transversely of the conveyor belt 10. Such an operative position of the first centering mechanism is shown in FIG. 1 by solid lines, whereas the inoperative position of the mechanism is shown by imaginary lines.

Similarly, the second centering mechanism includes an air cylinder device 78 forming a second actuator, which is fixedly mounted on the carriage 28. As shown in FIG. 2, the air cylinder device 78 is vertically arranged in the center region of the carriage 28, and has a plunger 80 with its lower end carrying a horizontal connecting pin 82 which extends transversely of the conveyor belt 10. There are arranged two substantially L-shaped levers 84, 86 each having a horizontal arm portion and a vertical arm portion. The levers 84, 86 are rotatably journaled by bearings 88, 90 at junctions between the respective two arm portions, and these bearings 88, 90 are secured to support members 92, 90 which are suspended from the carriage. At the lower ends of the vertical arm portions, the levers 84, 86 are provided with the above-mentioned centering elements 52, 54 in the form of pads, respectively, which are made of rubber or the like elastic material.

With the above-mentioned arrangement of the second centering mechanism, when the air cylinder device 78 is actuated to move the plunger 80 upwards, the levers 84, 86 are caused to swing about the respective axes of the bearings 88, 90 so that the pads 52, 54 are moved toward each other in the direction X, i.e. longitudinally of the conveyor belt 10. Such an operative position of the levers 84, 86 is shown in FIG. 2 by solid lines, whereas the inoperative position of the levers is shown by imaginary lines.

The operation of the above-mentioned arrangement of the centering apparatus is as follows:

The apparatus assumes an inoperative position until an article 16 to be transferred is fed to a predetermined position below the stationary frame 22. In this inoperative position, the air cylinder devices 44, 56, 78 are not supplied with working air, and the carriage 28 is in one end position along the guide tracks 30, 32 near one side edge of the stationary frame 22, i.e. near the support member 26 in the illustrated embodiment. In this end position of the carriage 28, the substantially L-shaped levers 84, 86 of the second centering mechanism are in their respective positions in which they do not interfere with the article 16 during the feed motion thereof. Also, the pads 48, 50 of the first centering mechanism are spaced from each other as shown by imaginary lines in FIG. 1. Thus, the article 16 can be fed to the predetermined position without any obstruction, by driving the conveyor belt 10 forwardly.

When the article 16 reaches the predetermined position, the cylinder device 44 is actuated so that the carriage 28 is caused to move transversely toward another end position along the guide tracks 30, 32, which end position corresponds to FIGS. 1 and 2. The substantially L-shaped levers 84, 86 are thus moved to the transversely central region above the conveyor belt 10.

Subsequently, the cylinder device 78 is actuated so that, as mentioned previously, the substantially L-shaped levers 84, 86 of the second centering mechanism are caused to swing about the axes of the bearings 88, 90 and the pads 52, 54 are moved toward each other longitudinally of the conveyor belt 10 until they are brought into engagement with the article 16 in place. This results in the centering of the article in the longitudinal direction X of the conveyor belt 10.

With a predetermined, slight time delay, after the cylinder device 78 of the second centering mechanism has been actuated, the centering of the article 16 in the transverse direction Y of the conveyor belt 10 is effected. To this end, the cylinder device 56 of the first centering mechanism is actuated so that, as mentioned previously, the pads 48, 50 are moved toward each other transversely of the conveyor belt 10 until they are brought into engagement with the article 16. The article is thus moved transversely to a predetermined position on the conveyor belt 10.

With these operations of the first and second centering mechanisms, the article 16 to be transferred can be centered accurately, both in the longitudinal and transverse directions of the conveyor belt 10, to have a desired orientation for further facilitated handlings. The centering of the articles can be carried out automatically, in a short time and in a simple and reliable manner.

The first and second centering mechanisms are arranged such that, when the pads 48, 50; 52, 54 are moved toward each other, the pads forming a pair are spaced from each other by a predetermined distance which is substantially the same as the size of the article 16 as measured in the direction in which relevant pads are moved. Thus, the article 16 can be protected from damage or breakage by the centering force which the pads 48, 50, 52, 54 exert upon the article.

In order that the article 16, which has already been centered in the longitudinal direction X of the conveyor belt 10, can thereafter be centered transversely without being adversely affected by the pads 52, 54 of the second centering mechanism, in one advantageous embodiment of the present invention, the minimum distance between these pads 52, 54 is made slightly (about 3 mm, or less) greater than the longitudinal size of the article 16. This embodiment makes it possible to eliminate the occurence of the article 16 being too tightly clamped between the pads 52, 54 and thus cannot be moved transversely, or the surface of the article 16 being subjected to abrasion under an excessive frictional resistance applied by the pads 52, 54.

Furthermore, in order to allow the handling of articles of various sizes and/or configurations, in another preferred embodiment of the present invention, each centering mechanism has an adjustable minimum distance between the two pads forming a pair. To this end, the actuator cylinder device of at least one centering mechanism, i.e. the cylinder device 78 of the second centering mechanism in the embodiment shown in FIGS. 1 and 2, may have a plunger 80 which projects upwardly from the cylinder housing, and may be associated with a bracket 96 which is secured to the carriage 28, and which carries an adjuster means in the form of a screw threaded rod 98 having its lower end engageable with the upper end of the plunger 80. The lower end of the screw threaded rod 98 may thus be moved vertically to define an upper limit of the stroke of the plunger 80 and hence, to adjust the minimum distance between the pads 52, 54 in accordance with the size of the article 16 as measured in the direction X in which the pads 52, 54 are moved. In the drawings, the bracket 96 and the screw threaded rod 98 are shown as being associated with the second centering mechanism only. However, such an arrangement may be provided for the first centering mechanism also.

Preferably, the centering elements in the form of pads 48, 50 and 52, 54 each consists of a material with a small frictional sliding resistance, and with an adequate elasticity. For example, each pad 48, 50, 52 and 54 may consist of elastic material, such as rubber and the like covered by suitable cloth. Alternatively, each pad 48, 50, 52 and 54 may consist of porous material providing elasticity, such as felt. Furthermore, each pad may be shaped so as to achieve line- or surface-contact with the article 16 to be centered. By this, the pressure with which the article 16 is centered by the pads 48, 50 and 52, 54 can be substantially reduced, and the article 16 is effectively protected from damages during the centering operation.

In the illustrated embodiment, the first and second centering mechanisms have been shown as being mounted on a common stationary frame 22. However, this is not an essential requirement, and the two mechanisms may be arranged spaced from each other in the longitudinal direction of the conveyor belt.

While the present invention has been explained with respect to certain preferred embodiments, it is apparent that various modifications and alterations may be made without departing from the scope of the present invention.

What is claimed is:

1. A centering apparatus for an article supported on, and conveyed by an endless conveyor belt, comprising:
   a first, stationary frame arranged across said conveyor belt;
   a first pair of centering members carried by said first frame, having respective first ends adapted to move toward and away from each other in a substantially transverse direction of the conveyor belt, said first ends of said first pair of centering members being engageable with respective side surfaces of said article;
   first actuator means mounted on the first frame and connected to respective second ends of said first pair of centering members for actuating said first pair of centering members such that said first ends thereof are moved toward each other while maintaining a predetermined first distance therebetween;
   a second, movable frame supported on said first frame and adapted to move in a substantially transverse direction of the conveyor belt, such that said second frame moves into, and out of an operative position along said conveyor belt;
   a second pair of centering members carried by said second frame, having respective first ends adapted to move toward and away from each other in a substantially longitudinal direction of the conveyor belt, at least in the operative position of the second frame, said first ends of said second pair of centering members being engageable with respective front and rear surfaces of said article in the operative position of the second frame, said second pair of centering members allowing an undisturbed movement of said article in a longitudinal direction along the conveyor belt when said second frame is out of the operative position;
   second actuator means mounted on said second frame and connected to respective second ends of said second pair of centering members for actuating said second pair of centering members such that said first ends thereof move toward each other while maintaining a predetermined second distance therebetween; and means for controlling the operation of said first and second actuator means such that one of the actuator means is actuated after the other of the two actuator means has been actuated.

2. The apparatus of claim 1, wherein said first ends of the centering members associated with said the other actuator means are adapted to be moved toward each other while maintaining said predetermined distance therebetween, wherein said distance is slightly greater than the size of said article as measured in the direction in which said first ends of the centering members associated with said the other actuator means are moved.

3. A centering apparatus for an article supported on, and conveyed by an endless conveyor belt, comprising:
a first, stationary frame arranged across said conveyor belt;
a first pair of centering members carried by said first frame, having respective first ends adapted to move toward and away from each other in a substantially transverse direction of the conveyor belt, said first ends of said first pair of centering members being engageable with respective side surfaces of said article;
first actuator means mounted on the first frame and connected to respective second ends of said first pair of centering members for actuating said first pair of centering members such that said first ends thereof are moved toward each other while maintaining a predetermined first distance therebetween;
a second, movable frame supported on said first frame and adapted to move in a substantially transverse direction of the conveyor belt, such that said second frame moves into, and out of an operative position along said conveyor belt;
a second pair of centering members carried by said second frame, having respective first ends adapted to move toward and away from each other in a substantially longitudinal direction of the conveyor belt, at least in the operative position of the second frame, said first ends of said second paid of centering members being engageable with respective front and rear surfaces of said article in the operative position of the second frame, said second pair of centering members allowing an undisturbed movement of the article in a longitudinal direction along the conveyor belt when said second frame is out of the operative position;
second actuator means mounted on said second frame and connected to respective second ends of said second pair of centering members for actuating said second pair of centering members such that said first ends thereof move toward each other while maintaining a predetermined second distance therebetween; and
means for adjusting said predetermined distance between said first ends of at least one pair of centering members.

4. The apparatus of claim 3 wherein at least one of the first and second actuator means comprises an actuator cylinder device including a plunger with a variable stroke, said cylinder device forming said means for adjusting the predetermined distance between said first ends of the centering members associated with said at least one of the actuator means.

* * * * *